(12) United States Patent
Gottlieb (10) Patent No.: US 9,947,366 B2
(45) Date of Patent: Apr. 17, 2018

(54) GROUP PORTRAITS COMPOSED USING VIDEO CHAT SYSTEMS

(71) Applicant: SHINDIG, Inc., New York, NY (US)

(72) Inventor: Steven M. Gottlieb, New York, NY (US)

(73) Assignee: SHINDIG, INC., New York, NY (US)

( * ) Notice: Subject to any disclaimer, the term of this patent is extended or adjusted under 35 U.S.C. 154(b) by 0 days.

(21) Appl. No.: 15/078,909

(22) Filed: Mar. 23, 2016

(65) Prior Publication Data

US 2016/0203842 A1 Jul. 14, 2016

Related U.S. Application Data

(63) Continuation of application No. 12/752,332, filed on Apr. 1, 2010, now Pat. No. 9,344,745.

(Continued)

(51) Int. Cl.
| | |
|---|---|
| *H04N 5/93* | (2006.01) |
| *G11B 27/036* | (2006.01) |
| *H04N 7/15* | (2006.01) |
| *H04N 21/2343* | (2011.01) |
| *H04N 21/41* | (2011.01) |
| *H04N 21/422* | (2011.01) |

(Continued)

(52) U.S. Cl.
CPC ............ *G11B 27/036* (2013.01); *H04N 7/15* (2013.01); *H04N 7/155* (2013.01); *H04N 21/234318* (2013.01); *H04N 21/4117* (2013.01); *H04N 21/4223* (2013.01); *H04N 21/42203* (2013.01); *H04N 21/4788* (2013.01); *H04N 21/47205* (2013.01); *H04N 21/8153* (2013.01)

(58) Field of Classification Search
CPC ............ H04N 7/15; H04N 21/234318; H04N 21/4117; H04N 21/42203; H04N 7/155; H04N 21/47205; H04N 21/4788; H04N 21/8153; H04N 21/4223; G11B 27/036
USPC ........................................... 386/278
See application file for complete search history.

(56) References Cited

U.S. PATENT DOCUMENTS 5,040,231 A 8/1991 Terzian
5,612,716 A * 3/1997 Chida ................. G06T 11/00
345/630

(Continued)

FOREIGN PATENT DOCUMENTS

CA 2771785 3/2011
CA 2774014 4/2011

(Continued)

OTHER PUBLICATIONS

U.S. Appl. No. 13/849,696, filed Mar. 25, 2013, U.S. Pat. No. 9,041,768, May 26, 2015.

(Continued)

*Primary Examiner* — William Tran
(74) *Attorney, Agent, or Firm* — Robert W. Morris; Ojeiku C. Aisiku; Eckert Seamans Cherin & Mellott, LLC (57) ABSTRACT

Systems and methods for generating group portraits using video chat systems are provided. A communications system can generate a group portrait that includes an image of two or more users. For example, a communications system can generate a group portrait that includes an image of each user participating in a video conference, and the group portrait may serve as a memento from the video conference.

13 Claims, 8 Drawing Sheets

Related U.S. Application Data (60) Provisional application No. 61/165,797, filed on Apr. 1, 2009.

(51) Int. Cl.
*H04N 21/4223* (2011.01)
*H04N 21/472* (2011.01)
*H04N 21/4788* (2011.01)
*H04N 21/81* (2011.01)

(56) References Cited

U.S. PATENT DOCUMENTS

| | | | |
|---|---|---|---|
| 5,802,220 A * | 9/1998 | Black | G06K 9/00248 382/100 |
| 6,044,146 A | 3/2000 | Gisby et al. | |
| 6,241,612 B1 | 6/2001 | Heredia | |
| 6,259,471 B1 | 7/2001 | Peters et al. | |
| 6,419,137 B1 | 7/2002 | Marshall et al. | |
| 6,515,681 B1 | 2/2003 | Knight | |
| 6,559,863 B1 | 5/2003 | Megiddo | |
| 6,654,346 B1 | 11/2003 | Mahalingaiah et al. | |
| 6,697,614 B2 | 2/2004 | Dorenbosch | |
| 7,007,235 B1 | 2/2006 | Hussein | |
| 7,478,129 B1 | 1/2009 | Chemtob | |
| 7,487,211 B2 | 2/2009 | Beavers et al. | |
| 7,495,687 B2 | 2/2009 | DuMas et al. | |
| 7,515,560 B2 | 4/2009 | DuMas et al. | |
| 7,593,032 B2 | 9/2009 | Civanlar et al. | |
| 7,787,447 B1 | 8/2010 | Egan et al. | |
| 8,060,560 B2 | 11/2011 | Vonog et al. | |
| 8,144,187 B2 | 3/2012 | Moore et al. | |
| 8,147,251 B1 | 4/2012 | Anson | |
| 8,171,154 B2 | 5/2012 | Vonog et al. | |
| 8,225,127 B2 | 7/2012 | Vonog et al. | |
| 8,230,355 B1 | 7/2012 | Bauermeister | |
| 8,390,670 B1 | 3/2013 | Gottlieb | |
| 8,405,702 B1 | 3/2013 | Gottlieb | |
| 8,429,704 B2 | 4/2013 | Vonog et al. | |
| 8,458,328 B2 | 6/2013 | Dubovik et al. | |
| 8,463,677 B2 | 9/2013 | Vonog et al. | |
| 8,527,654 B2 | 9/2013 | Vonog et al. | |
| 8,549,167 B2 | 10/2013 | Vonog et al. | |
| 8,558,868 B2 | 10/2013 | Prentice | |
| 8,635,293 B2 | 1/2014 | Fisher | |
| 8,647,206 B1 | 2/2014 | Gottlieb | |
| 8,749,610 B1 | 6/2014 | Gossweiler | |
| 8,779,265 B1 | 7/2014 | Gottlieb | |
| 8,902,272 B1 | 12/2014 | Gottlieb | |
| 8,917,310 B2 | 12/2014 | Gottlieb | |
| 8,929,516 B2 | 1/2015 | Odinak | |
| 9,215,412 B2 | 12/2015 | Gottlieb | |
| 9,241,131 B2 | 1/2016 | Desai | |
| 2002/0094831 A1 | 7/2002 | Maggenti et al. | |
| 2002/0102999 A1 | 8/2002 | Maggenti et al. | |
| 2002/0143877 A1 | 10/2002 | Hackbarth | |
| 2003/0097385 A1 | 5/2003 | Lee et al. | |
| 2004/0022202 A1 | 2/2004 | Yang | |
| 2005/0032539 A1 | 2/2005 | Noel et al. | |
| 2005/0034076 A1 | 2/2005 | Belhumeur et al. | |
| 2005/0129324 A1 * | 6/2005 | Lemke | H04N 1/387 382/254 |
| 2005/0132288 A1 | 6/2005 | Kim et al. | |
| 2005/0134946 A1 * | 6/2005 | Tsue | G06T 11/60 358/537 |
| 2005/0262542 A1 | 11/2005 | Deweese et al. | |
| 2006/0002315 A1 | 1/2006 | Theurer | |
| 2006/0055771 A1 | 3/2006 | Kies | |
| 2006/0063555 A1 | 3/2006 | Robbins | |
| 2006/0114314 A1 | 6/2006 | Dunko | |
| 2006/0140138 A1 | 6/2006 | Hill | |
| 2007/0168426 A1 | 7/2007 | Ludwig et al. | |
| 2007/0186171 A1 | 8/2007 | Junuzovic | |
| 2007/0229652 A1 | 10/2007 | Center, Jr. et al. | |
| 2007/0234220 A1 | 10/2007 | Khan | |
| 2007/0265074 A1 | 11/2007 | Akahori et al. | |
| 2008/0002668 A1 | 1/2008 | Asokan et al. | |
| 2008/0037763 A1 | 2/2008 | Shaffer et al. | |
| 2008/0120560 A1 * | 5/2008 | Cohen | G06T 11/60 715/764 |
| 2008/0136895 A1 * | 6/2008 | Mareachen | H04N 7/147 348/14.03 |
| 2008/0136898 A1 | 6/2008 | Eisenberg et al. | |
| 2008/0137559 A1 | 6/2008 | Sasaki et al. | |
| 2008/0146339 A1 | 6/2008 | Olsen et al. | |
| 2008/0181260 A1 | 7/2008 | Vonog et al. | |
| 2008/0274810 A1 | 11/2008 | Hayashi et al. | |
| 2009/0024963 A1 | 1/2009 | Lindley et al. | |
| 2009/0033737 A1 | 2/2009 | Goose et al. | |
| 2009/0037826 A1 | 2/2009 | Bennetts | |
| 2009/0040289 A1 | 2/2009 | Hetherington et al. | |
| 2009/0204906 A1 | 8/2009 | Irving | |
| 2009/0209339 A1 | 8/2009 | Okada | |
| 2009/0210789 A1 | 8/2009 | Thakkar | |
| 2009/0249244 A1 | 10/2009 | Robinson et al. | |
| 2009/0254843 A1 | 10/2009 | Van Wie | |
| 2009/0257730 A1 * | 10/2009 | Chen | H04N 1/00244 386/278 |
| 2009/0288007 A1 | 11/2009 | Leacock | |
| 2010/0005411 A1 | 1/2010 | Duncker | |
| 2010/0010890 A1 | 1/2010 | Ditkovski et al. | |
| 2010/0026780 A1 | 2/2010 | Tico et al. | |
| 2010/0026802 A1 | 2/2010 | Titus et al. | |
| 2010/0030578 A1 | 2/2010 | Siddique et al. | |
| 2010/0122184 A1 | 5/2010 | Vonog et al. | |
| 2010/0130868 A1 | 5/2010 | Hargrove et al. | |
| 2010/0146085 A1 | 6/2010 | Van Wie | |
| 2010/0258474 A1 | 10/2010 | Vonog et al. | |
| 2010/0316232 A1 | 12/2010 | Acero et al. | |
| 2011/0055317 A1 | 3/2011 | Vonog et al. | |
| 2011/0060992 A1 | 3/2011 | Jevons | |
| 2011/0072366 A1 | 3/2011 | Spencer et al. | |
| 2011/0078532 A1 | 3/2011 | Vonog et al. | |
| 2011/0164141 A1 | 7/2011 | Tico et al. | |
| 2011/0185286 A1 | 7/2011 | Moyers | |
| 2011/0209104 A1 | 8/2011 | Hinckley et al. | |
| 2011/0270922 A1 | 11/2011 | Jones | |
| 2011/0279634 A1 | 11/2011 | Periyannan | |
| 2012/0002001 A1 | 1/2012 | Prentice | |
| 2012/0038550 A1 | 2/2012 | Lemmey et al. | |
| 2012/0039382 A1 | 2/2012 | Vonog et al. | |
| 2012/0041859 A1 | 2/2012 | Vonog et al. | |
| 2012/0060101 A1 | 3/2012 | Vonog et al. | |
| 2012/0084456 A1 | 4/2012 | Vonog et al. | |
| 2012/0084672 A1 | 4/2012 | Vonog et al. | |
| 2012/0084682 A1 | 4/2012 | Sirpal | |
| 2012/0098919 A1 | 4/2012 | Tang | |
| 2012/0110162 A1 | 5/2012 | Dubovik et al. | |
| 2012/0110163 A1 | 5/2012 | Dubovik et al. | |
| 2012/0124128 A1 | 5/2012 | Vonog et al. | |
| 2012/0127183 A1 | 5/2012 | Vonog et al. | |
| 2012/0151541 A1 | 6/2012 | Vonog et al. | |
| 2012/0182384 A1 | 7/2012 | Anderson | |
| 2012/0192087 A1 | 7/2012 | Lemmey | |
| 2012/0198334 A1 | 8/2012 | Surin et al. | |
| 2012/0246227 A1 | 9/2012 | Vonog et al. | |
| 2012/0249719 A1 | 10/2012 | Lemmey et al. | |
| 2012/0254649 A1 | 10/2012 | Vonog et al. | |
| 2012/0272162 A1 | 10/2012 | Surin et al. | |
| 2012/0280905 A1 | 11/2012 | Vonog et al. | |
| 2012/0293600 A1 | 11/2012 | Lemmey et al. | |
| 2012/0297320 A1 | 11/2012 | Lemmey et al. | |
| 2012/0326866 A1 | 12/2012 | Lemmey et al. | |
| 2012/0331089 A1 | 12/2012 | Vonog et al. | |
| 2012/0331387 A1 | 12/2012 | Lemmey et al. | |
| 2013/0014027 A1 | 1/2013 | Lemmey | |
| 2013/0014028 A1 | 1/2013 | Lemmey et al. | |
| 2013/0018960 A1 | 1/2013 | Knysz et al. | |
| 2013/0019184 A1 | 1/2013 | Vonog et al. | |
| 2013/0021431 A1 | 1/2013 | Lemmey et al. | |
| 2013/0024785 A1 | 1/2013 | Van Wie | |
| 2013/0063542 A1 | 3/2013 | Bhat | |
| 2013/0073978 A1 | 3/2013 | Butler | |
| 2013/0088518 A1 | 4/2013 | Lemmey et al. | |

(56) References Cited

U.S. PATENT DOCUMENTS

| | | |
|---|---|---|
| 2013/0097512 A1 | 4/2013 | Hong et al. |
| 2013/0123019 A1 | 5/2013 | Sullivan |
| 2013/0156093 A1 | 6/2013 | Vonog et al. |
| 2013/0169742 A1 | 7/2013 | Wu |
| 2013/0173531 A1 | 7/2013 | Rinearson |
| 2013/0191479 A1 | 7/2013 | Gottlieb |
| 2013/0201279 A1 | 8/2013 | Civinlar et al. |
| 2013/0216206 A1 | 8/2013 | Dubin |
| 2013/0239063 A1 | 9/2013 | Ubillos et al. |
| 2013/0254287 A1 | 9/2013 | Biswas |
| 2013/0289983 A1 | 10/2013 | Park |
| 2013/0321648 A1 | 12/2013 | Tamiya |
| 2014/0004496 A1 | 1/2014 | Reddy |
| 2014/0019882 A1 | 1/2014 | Chew et al. |
| 2014/0040784 A1 | 2/2014 | Behforooz et al. |
| 2014/0184723 A1 | 7/2014 | Morrison |
| 2014/0229888 A1 | 8/2014 | Ko et al. |
| 2014/0325428 A1 | 10/2014 | Lee et al. |
| 2015/0046800 A1 | 2/2015 | Isidore et al. |
| 2015/0052453 A1 | 2/2015 | Yu et al. |
| 2015/0106750 A1 | 4/2015 | Konami |

FOREIGN PATENT DOCUMENTS

| | | |
|---|---|---|
| EP | 0721726 | 12/2000 |
| EP | 2471221 | 7/2012 |
| EP | 2484091 | 8/2012 |
| EP | 2630630 | 8/2013 |
| EP | 2636194 | 9/2013 |
| GB | 2446529 | 8/2008 |
| WO | 2009077936 | 6/2009 |
| WO | 2011025989 | 3/2011 |
| WO | 2011041229 | 4/2011 |
| WO | 2012021173 | 2/2012 |
| WO | 2012021174 | 2/2012 |
| WO | 2012021901 | 2/2012 |
| WO | 2012054089 | 4/2012 |
| WO | 2012054895 | 4/2012 |
| WO | 2012060977 | 5/2012 |
| WO | 2012060978 | 5/2012 |
| WO | 2012103376 | 8/2012 |
| WO | 2012135384 | 10/2012 |
| WO | 2012151471 | 11/2012 |
| WO | 2012177641 | 12/2012 |
| WO | 2012177779 | 12/2012 |
| WO | 2013343207 | 3/2013 |
| WO | 2013149079 | 10/2013 |

OTHER PUBLICATIONS

U.S. Appl. No. 14/691,781, filed Apr. 21, 2015, U.S. Pat. No. 9,357,169, May 31, 2016.
U.S. Appl. No. 14/528,977, filed Oct. 30, 2014.
U.S. Appl. No. 13/925,059, filed Jun. 24, 2013, U.S. Pat. No. 9,401,037, Jul. 26, 2016.
U.S. Appl. No. 14/068,261, filed Oct. 31, 2013
U.S. Appl. No. 14/242,883, filed Apr. 15, 2014.
About TokBox, Inc., All about TokBox, http://www.tokbox.com/about, retrieved Feb. 4, 2011, p. 1.
CrunchBase Profile, CrunchBase readeo, http://www.crunchbase.com/company/readeo, retrieved Feb. 3, 2011, pp. 1-2.
CrunchBase Profile, CrunchBase Rounds, http://www.crunchbase.com/company/6rounds, retrieved Feb. 4, 2011, pp. 1-2.
CrunchBase Profile, CrunchBase TokBox, http://www.crunchbase.com/company/tokbox, retrieved Feb. 4, 2011, pp. 1-3.
Online Collaboration GoToMeeting, http://www.gotomeeting.com/fec/online_collaboration, retrieved Feb. 4, 2011, pp. 1-4.
Readeo Press Release, http://www.mmpublicity.com, Feb. 25, 2010, pp. 1-2.
Rounds.com, Make friends online and enjoy free webcame chats, http://www.rounds.com/about, retrieved Feb. 4, 2011, pp. 1-3.
2011 Blackboard Collaborate User's Guide.
2007 WebEx Meeting Center User's Guide.
MacDonald, Heidi—Shindig Offers Authors Interactive Video Conferencing—Blog posted Sep. 12, 2012—Publishers Weekly. Retrieved from [http://publishersweekly.com] on [Aug. 15, 2016]. 5 Pages.
Shindig, Various Informational Pages Published as of Jul. 21, 2012—Retrieved via Internet Archive from [http://shindigevents.com] on [Aug. 5, 2016].
Slideshare—Shindig Magazine Video Chat Events. Slide Presentation published Oct. 9, 2012. Retrieved from [http://slideshart.net] on [Aug. 11, 2016]. 11 Pages.

* cited by examiner

GROUP PORTRAITS COMPOSED USING VIDEO CHAT SYSTEMS

CROSS-REFERENCE TO RELATED APPLICATION

This application claims the benefit of U.S. patent application Ser. No. 12/752,332, filed on Apr. 1, 2010, which claims the benefit of U.S. Provisional Application No. 61/165,797, filed Apr. 1, 2009, the disclosures of which are incorporated by reference herein in their entirety.

Co-pending U.S. patent application Ser. No. 12/624,829, entitled "MULTIPARTY COMMUNICATIONS SYSTEMS AND METHODS THAT UTILIZE MULTIPLE MODES OF COMMUNICATION" and filed on Nov. 24, 2009, is hereby incorporated by reference herein in its entirety.

Co-pending U.S. patent application Ser. No. 12/624,840, entitled "MULTIPARTY COMMUNICATIONS SYSTEMS AND METHODS THAT OPTIMIZE COMMUNICATIONS BASED ON MODE AND AVAILABLE BANDWIDTH" and filed on Nov. 24, 2009, is hereby incorporated by reference herein in its entirety.

Co-pending U.S. patent application Ser. No. 12/624,848, entitled "MULTIPARTY COMMUNICATIONS SYSTEMS AND METHODS THAT EMPLOY COMPOSITE COMMUNICATIONS" and filed on Nov. 24, 2009, is hereby incorporated by reference herein in its entirety.

BACKGROUND OF THE INVENTION

Some traditional communications systems allow users to communicate using video chat, but such systems provide inadequate options for users to memorialize their interactions. For example, a traditional communications system may allow a user to save a video chat as one or more video files that include the feeds from each, but that medium is difficult for a user to transfer to paper or display to others. Moreover, such video files are inherently different from the group photographs that may be used to memorialize real-life gatherings.

SUMMARY OF THE INVENTION

Systems and methods for generating group portraits using video chat systems are provided. A communications system can generate a group portrait that includes an image of two or more users. For example, a communications system can generate a group portrait that includes an image of each user participating in a video conference, and the group portrait may serve as a memento from the video conference. In some embodiments, the communications system can initially provide a group portrait creation screen with silhouettes denoting suitable locations for user images. Each user may use the silhouettes to select a location for his image. The communications system can then capture an image of the user (e.g., using an embedded video camera), and add that image to the portrait at the selected location. The communications system can remove the silhouette from the screen as each location becomes associated with an image.

In some embodiments, a communications system may provide a user with a screen that includes options for configuring a group portrait. For example, a communications system may provide various portrait arrangements from which a user can choose. In another example, a communications system may allow a user to specify how many images a group portrait will initially include. In yet other examples, a communications system may provide a user with an option to specify a title for a portrait and/or an option to specify a background or foreground image for a portrait.

In some embodiments, a communications system may facilitate creation of group video portraits. For example, instead of using images of each user, video clips of each user can be captured and then compiled into a group video portrait. Such group video portraits can be created using similar processes as those used to create still group portraits.

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION

Figure 1:
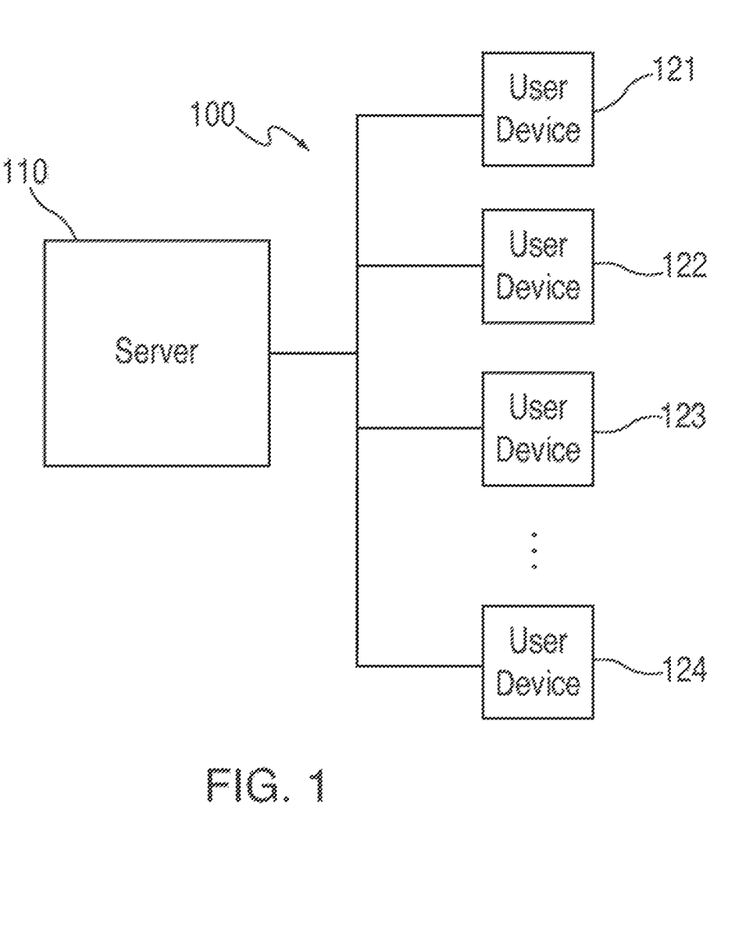
FIG. 1 is a schematic view of an illustrative communications system in accordance with one embodiment of the invention.

In some embodiments, a communications system may facilitate communications between users. Communications system 100 may include at least one server 110. Server 110 can be any suitable server for facilitating communications between two or more users. For example, server 110 may include several interconnected computers running software to control communications.

Communications system 100 may include several user devices 121-124. Server 110 may be coupled with user devices 121-124 through any suitable network. For example, server 110 may be coupled with user devices 121-124 through Wi-Fi (e.g., a 802.11 protocol), Bluetooth®, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS-136/TDMA, iDen, LTE or any other suitable cellular network or protocol), infrared, TCP/IP (e.g., any of the protocols used in each of the TCP/IP layers), HTTP, BitTorrent, FTP, RTP, RTSP, SSH, Voice over IP (VOIP), any other communications protocol, or any combination thereof. Each of user devices 121-124 may include an electronic device (e.g., a personal computer or a personal communications system). In some embodiments, each user device may correspond to a single user. For example, user device 121 may correspond to a first user and user device 122 may correspond to a second user. Server 110 may control communications between two or more of the user devices. For example, server 110 may control one-to-one communications between user device 121 and 122 and/or multi-party communications between user device 121 and user devices 122-124. Each user device may provide outputs to a user and receive inputs from the user when facilitating communications. For example, a user device may include one or more output interfaces (e.g., display screen or audio output) for providing communication outputs to a user and one or more input interfaces (e.g., a controller, joystick, keyboard, or mouse) for receiving communication inputs from a user.

While only one server and four user devices (e.g., devices 121-124) are shown in FIG. 1, it is understood that any number of servers and user devices can be provided in a communications system. A more detailed description of suitable communications systems for facilitating user communications can be found in U.S. patent application Ser. No. 12/624,829, which has been incorporated by reference.

While the previous discussion can be applied to systems for creating group portraits when the individual users are located remotely from each other, it is understood that this disclosure can also be applied to embodiments for creating group portraits when the individual users are congregated in one location. For example, a single user device can be used to sequentially capture an individual image of each user, and those images can be used to compose a group portrait in accordance with the disclosure. More specifically, a single user device may be provided that can capture an image of each individual user and then add that image to a group portrait. Accordingly, a new image may be added to the group portrait every time that a new user interacts with the user device.

In accordance with the present disclosure, a communications system may generate group portraits that include images of various users. For example, a communications system may generate a group portrait by combining a background image with images of each user in a communications group. The communications system may allow one or more of the users in a communications group to control the creation of the group portrait. For example, each user in the communications group may be able to adjust her image and/or specify where that image is located in the group portrait. In some embodiments, a communications system may display a group portrait creation screen to allow one or more users to control the creation of the group portrait.

Figure 2:
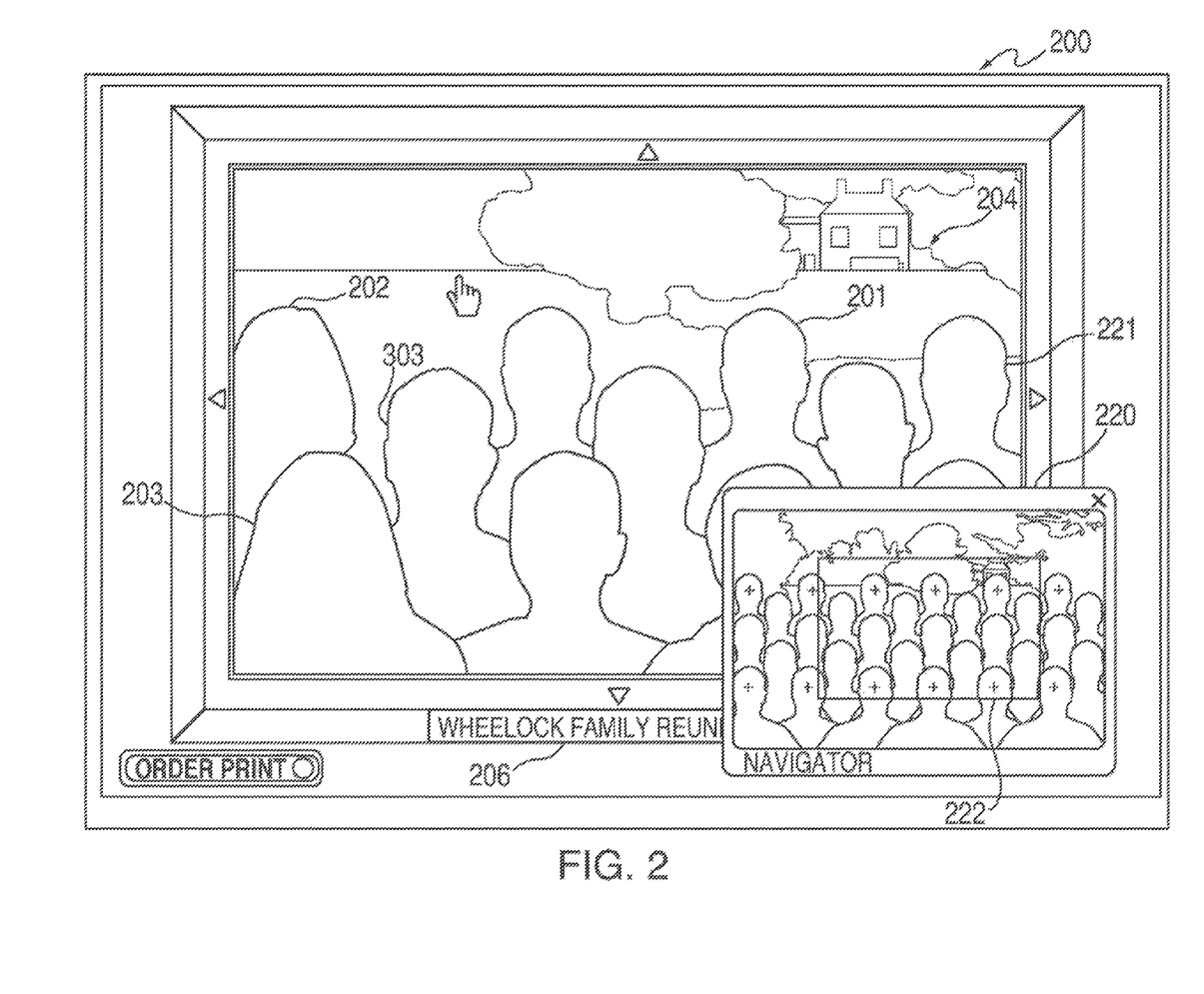
FIG. 2 is a schematic view of an illustrative group portrait creation screen in accordance with one embodiment of the invention.

FIG. 2 includes screen 200 for creating a group portrait in accordance with one embodiment of the invention. A communications system may provide screen 200 through one or more user devices (e.g., user devices 121-124 in system 100). The one or more user devices displaying screen 200 may receive user inputs related to screen 200 through one or more input devices (e.g., a touch screen display or computer mouse).

A user device may display screen 200 before any users have added their images to a group portrait. In other words, screen 200 may serve as the starting point for the group portrait. Screen 200 can include one or more silhouettes (e.g., silhouettes 201-203) denoting suitable locations for user images. The number of user image locations displayed on screen 200 may be based on the number of users that will be in the group portrait. For example, the number of user image locations may be based on the number of users in a communications group so that every user can be included in the group portrait. In another example, the number of user image locations may be based on a number that a user has manually specified.

The user image locations may be arranged so that each location does not substantially interfere with other locations. For example, each location may include a region for a user's face, and the locations may be arranged so that those regions do not overlap. Moreover, the user image locations may be assigned to different layers so that some user images will be displayed in front of other user images if the two user images overlap. For example, silhouette 203 may represent a user image location with a higher layer than silhouette 202. Accordingly, a user image that replaces silhouette 203 may be displayed in front of a user image that replaces silhouette 202.

Screen 200 may also include other indicia that will be part of the group portrait. In some embodiments, screen 200 may include background image 204. Background image 204 may be automatically chosen by a communications system, or manually selected by a user. For example, a user may manually select an image that is relevant to the group of users, and that selected image may be used as background image 204. In some embodiments, screen 200 may include title 206. Title 206 may be automatically chosen by a communications system or may be manually selected by a user.

Screen 200 can include navigator 220 for previewing and accessing different portions of a group portrait. For example, navigator 220 may display an entire group portrait and primary window 221 may only display a portion of a group portrait. In some embodiments, a user may be able to change the zoom of primary window 221 to change the size of the portion displayed in primary window 221. Navigator 220 can include indicator 222 to represent the portion of the group portrait that is displayed in primary window 221.

Figure 3:
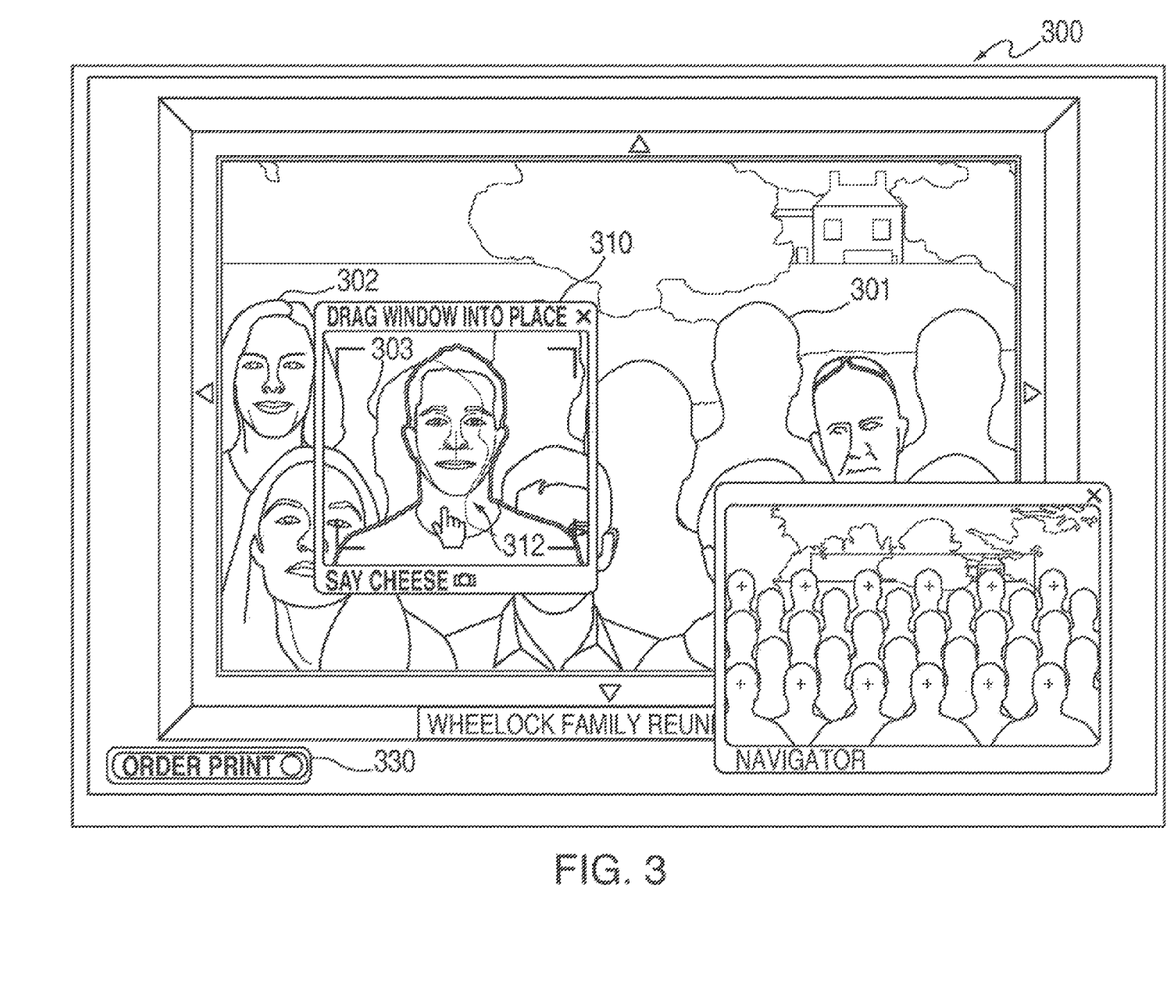
FIG. 3 is a schematic view of an illustrative group portrait creation screen in accordance with one embodiment of the invention.

As user images are added to a group portrait, the portrait creation screen may reflect such changes. For example, each user image may replace a silhouette as it is added to the group portrait. FIG. 3 includes screen 300 for creating a group portrait in accordance with one embodiment of the invention. A communications system may provide screen 300 through one or more user devices (e.g., user devices 121-124 in system 100). Screen 300 may provide a preview of a group portrait after at least some user images have been added. For example, screen 300 may include user images that have been associated with user image locations. As each location becomes associated with a user image, the silhouette may be replaced by that image. For example, user image 302 may be displayed in screen 300 as a replacement to silhouette 202 of screen 200. Screen 200 can still include one or more silhouettes representing locations that are not associated with user images (e.g., silhouette 301).

Screen 300 may include window 310 for adding a user image to the group portrait. For example, window 310 may allow a user to add an image of herself to the group portrait. In some embodiments, window 310 may include video feed 312 of a user. For example, video feed 312 may include the video output from a camera in the user device that is displaying screen 300 (e.g., one of user devices 121-124). Window 310 may be moveable over screen 300. A user may be able to move window 310 over screen 300 to position video feed 312 over a location that is not associated with a user image. In some embodiments, a communications system may automatically center window 310 over an unassociated location.

When window 310 is over a location that is unassociated with a user image, the communications system may change the appearance of the corresponding silhouette. For example, the communications system may change the color of silhouette 303 when window 310 is positioned over the corresponding location. This change in appearance can show a user how to pose for his image in the group portrait.

In some embodiments, the video feed may be adjusted before an image is captured for the group portrait. For example, the brightness or contrast of a video feed can be adjusted to match the rest of the group portrait. In another example, the size of a user in a video feed can be adjusted to match the size of the silhouette in the group portrait or the other users in the group portrait. It is understood that adjustments may be made to normalize each image so that the group portrait appears to have been captured by a single camera. Adjustments may be performed automatically by a communications system or manually by the user.

Once any adjustments have been made, the user can provide an input (e.g., by pressing a particular key or clicking once on window 310) instructing the user device to capture the image. The communications system may then generate a user image based on the video feed. In some embodiments, the user image may be adjusted after it has been captured. For example, the brightness, contrast, or size of the user image may be adjusted after the image has been captured. The communications system may then associate the captured image with the appropriate location and add the image to screen 300.

Using this procedure, other users may add images to the group portrait. If a user tries to add an image to the group portrait after all the user image locations have been utilized, the communications system may create one or more additional locations and corresponding silhouettes. For example, the communications system may create additional rows or columns of locations and corresponding silhouettes. In some embodiments, the communications system may add the additional locations to the current arrangement of user images. In other embodiments, the communications system may rearrange and/or resize the existing images to incorporate the newly added locations.

In some embodiments, a user may provide an input to request a final version of a group portrait. For example, a user may select an order print button 330 to request a final version of a group portrait. In some embodiments, the communications system may begin preparing a final version of the group portrait in response to receiving such an input. In other embodiments, the communications system may wait to prepare a final version until a user with administrative rights has finalized the portrait or until all eligible users have added an image to the portrait. To prepare a final version of the group portrait, the communications system may remove any remaining silhouettes representing locations that are not associated with images. In some embodiments, the communications system may display a background image (see, e.g., background image 204) in the unutilized locations. In other embodiments, the communications system may rearrange the user images to condense the group portrait. For example, the communications system may move one or more user images to central unutilized locations so that the group portrait doesn't include any discontinuities (e.g., gaps between user images).

Once a final version of the group portrait has been prepared, a digital or physical copy of the portrait can be provided to the user. For example, the communications system may compose a digital copy and transmit it to the user via e-mail. In another example, the communications system may print or commission a third-party to print a physical copy and then deliver it to the user.

In some embodiments, a communications system may provide users with configuration options when creating or editing a group portrait. For example, a user may be able to select a background image and/or title for a group portrait. In some embodiments, a user may be able to select the arrangement of individual images in the group portrait. The communications system may limit which users can configure the group portrait. For example, the communications system may only permit those users with administrative rights to configure the group portrait.

Figure 4:
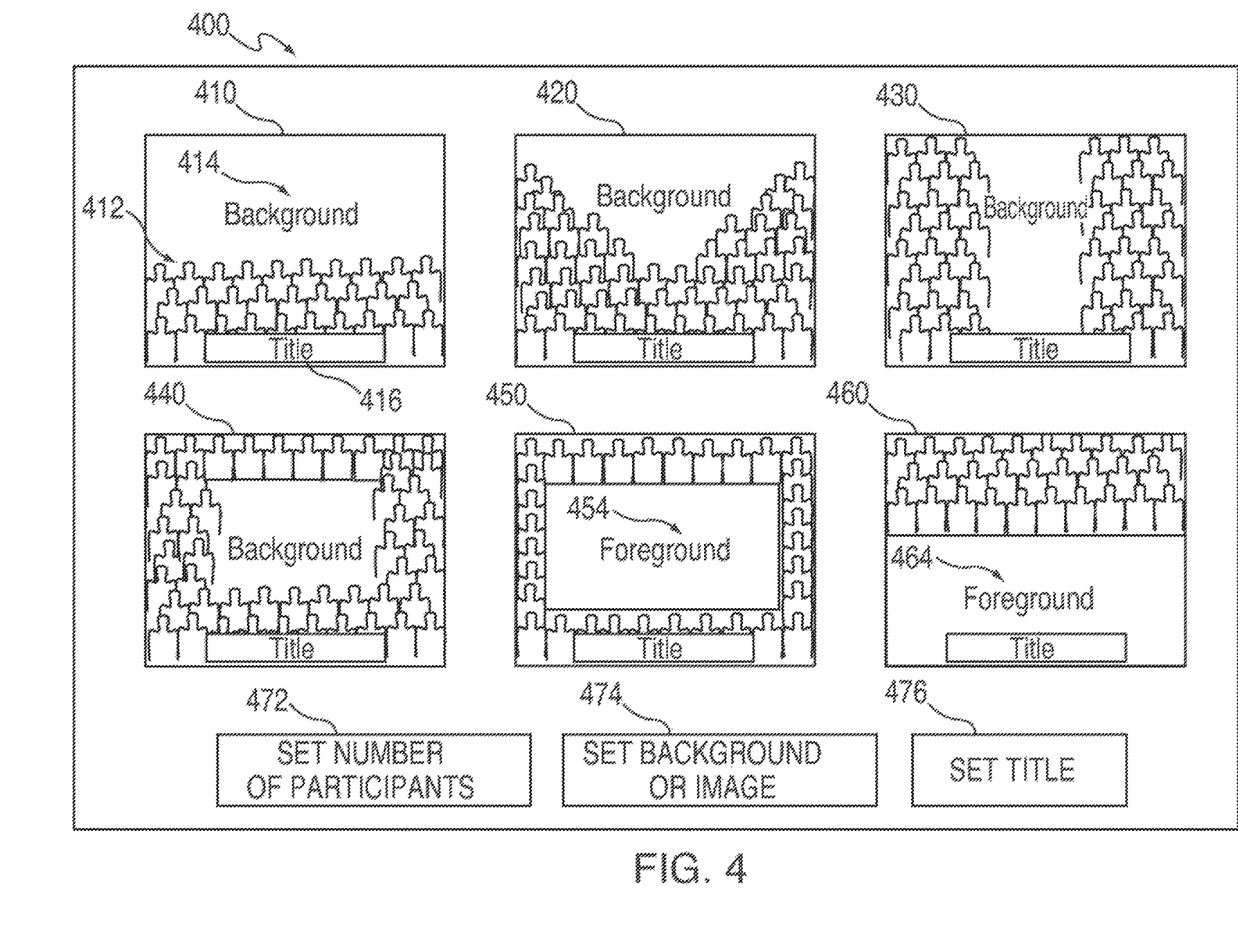
FIG. 4 is a schematic view of an illustrative group portrait configuration screen in accordance with one embodiment of the invention.

FIG. 4 includes screen 400 for configuring a group portrait in accordance with one embodiment of the invention. A communications system can provide screen 400 through one or more user devices (e.g., user devices 121-124 in system 100). The one or more user devices displaying screen 400 may receive user inputs related to screen 400 through one or more input devices (e.g., a touch screen display or computer mouse). One or more users can select options on screen 400 to rearrange or customize group portraits. Screen 400 can be displayed at the beginning of the group portrait creation process (e.g., before screen 200 is displayed), at any point during the group portrait creation process (e.g., when a user accesses a configuration menu during the process), and/or at the finalization of a group portrait (e.g., after all user images have been added).

Screen 400 can include various portrait arrangements that a user can select from when configuring a group portrait. For example, screen 400 includes bottom arrangement 410, v-shaped arrangement 420, side arrangement 430, border arrangement 440, and central image arrangement 450, and bottom image arrangement 460. Each arrangement may include silhouettes representing the locations for user images (see, e.g., silhouettes 412). Each arrangement may also include a placeholder for a group portrait's title (see, e.g., title 416). Some arrangements may include a placeholder for a background image (see, e.g., background image 414) and/or a placeholder for a foreground image (see, e.g., foreground 454 or foreground 464). In some embodiments, the silhouettes and placeholders in each portrait arrangement may be replaced by actual user images, titles, and background/foreground images as these features are added to the group portrait. In this manner, the portrait arrangements may serve as previews of different portrait configurations.

Screen 400 can include configuration options that a user can set when configuring a group portrait. For example, screen 400 may include option 472 that a user can select to set the number of user image locations that will initially be in the group portrait. Providing an initial number of user image locations and corresponding silhouettes may result in a more meaningful preview of the different portrait arrangements (see, e.g., arrangement 410) as well as the portrait itself during creation (see, e.g., screen 200). However, the number of user image locations may automatically increase if users attempt to add images to the portrait beyond the initial number. Screen 400 may include option 474 that a user can select to set the background or foreground image for a group portrait. For example, a user may select option 474 and specify an image to use as the background or foreground image for a group portrait. Screen 400 may also include option 476 that a user can select to set the title of a group portrait. For example, a user may select option 476 and specify a word or phrase as the title of a group portrait.

While screen 400 includes various options for a user to manually configure a group portrait, it is understood that a communications system may automatically configure a group portrait in some embodiments. For example, a communications system may automatically configure a group portrait to include an initial number of user image locations based on the number of users in a communications group by assuming that all or a percentage of the users in the group will add a user image to the portrait. In another example, the communications system may automatically configure a group portrait title based on the title of a communications group.

Figure 5:
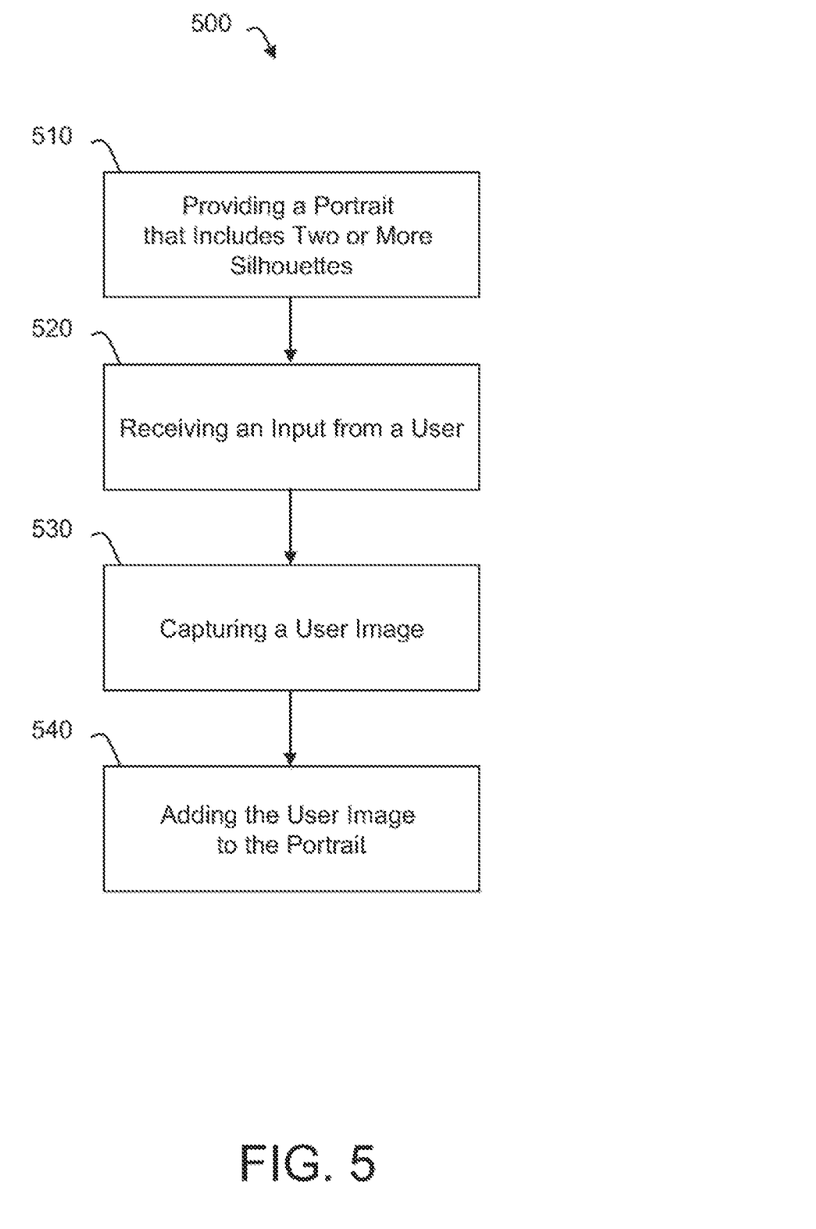
FIGS. 5-7 are flowcharts of illustrative processes for generating a group portrait in accordance with various embodiments of the invention.

FIG. 5 includes process 500 for creating a group portrait in accordance with one embodiment of the invention. Process 500 can be performed by a communications system (e.g., system 100). At block 510, a portrait can be provided that includes two or more silhouettes. For example, a communications system can provide screen 200 to a user through a user device (e.g., user devices 121-124 in system 100). In some embodiments, process 500 may include receiving a portrait arrangement selection from a user (e.g., using screen 400) prior to block 510, and the silhouettes provided at block 510 may be in the specified portrait arrangement.

At block 520, an input can be received from a user. For example, the communications system may receive an input from a user through an input device in a user device (e.g., user devices 121-124 in system 100). The input received at block 520 may specify a location for the user's image in the group portrait (e.g., using screen 300). In some embodiments, a video feed of a user may be displayed at the location specified by the user (e.g., video feed 312 shown in FIG. 3). In some embodiments, the input received at block 520 may specify that the user is ready for an image to be captured. In some embodiments, block 510 can be skipped and process 500 may proceed directly from block 510 to block 530. For example, process 500 may be executed in an automatic mode that does not require a user input before capturing a user image.

At block 530, a user image is captured. For example, the communications system may capture a user image with a video camera embedded in a user device (e.g., user devices 121-124 in system 100). At block 540, the user image may be added to the portrait. For example, the communications system may add the user image to the portrait at a location specified by the user (e.g., as part of the input received at block 520). The communications system may then remove the corresponding silhouette from the portrait when the user image is added. In some embodiments, the portrait may be updated to show the added user image and then process 500 may proceed by capturing other user images and adding them to the portrait.

In some embodiments, process 500 may further include finalizing the group portrait. For example, the group portrait can be finalized automatically (e.g., once all eligible users have added images) or based on user input (e.g., by pushing button 330). When finalizing a group portrait, any remaining, unused silhouettes may be removed from the portrait. In some embodiments, images in the group portrait may be rearranged when finalizing the portrait. For example, a group portrait may include a discontinuity (e.g., gap) between images where silhouettes were not replaced with user images and, when finalizing the portrait, the images may be arranged to remove one or more discontinuities.

Figure 6:
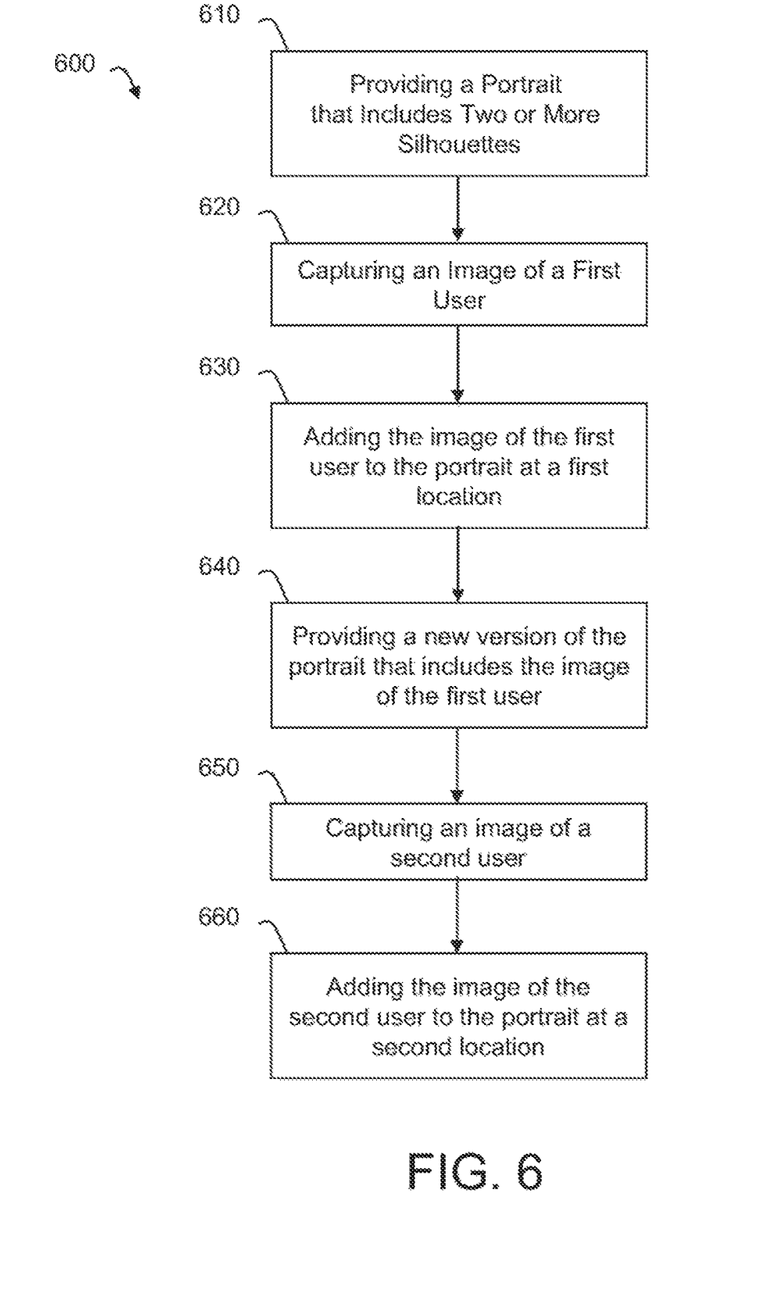

FIG. 6 includes process 600 for creating a group portrait in accordance with one embodiment of the invention. Process 600 can be performed by a communications system (e.g., system 100). At block 610, a portrait can be provided that includes two or more silhouettes. Block 610 is substantially similar to block 510 of process 500 and the previous description of the latter can be applied to the former. At block 620, an image of a first user can be captured. For example, a user device (e.g., user devices 121-124 in system 100) can use an embedded video camera to capture an image of a first user. In some embodiments, an image of a first user can be captured in response to an input from the first user. For example, the communications system may receive an input from a user that specifies a location for the user's image in the group portrait (e.g., using screen 300) and an image of the user may be captured in response to that input. At block 630, the image of the first user can be added to the portrait at a first location. In some embodiments, the first location can be specified by the first user. For example, the first user may specify the first location by selecting a silhouette at the first location. In some embodiments, the communications system may then remove a corresponding silhouette from the portrait when the user image is added. At block 640, a new version of the portrait that includes the image of the first user can be provided. For example, other users may be provided with a new version of the portrait that includes the first user's image. A block 650, an image of a second user can be captured. With the exception of involving a second user, block 650 is substantially similar to block 620 and the previous description of the latter can be applied to the former. However, block 650 corresponds to capturing an image of another user that is different from the first user. In some embodiments, block 650 can be performed by a different user device than block 620. At block 660, the image of the second user can be added to the portrait at a second location. With the exception of involving a second user, block 660 is substantially similar to block 630 and the previous description of the latter can be applied to the former. In some embodiments, the image of the first user may be moved based on the second location. For example, the image of the first user may be moved so that it is closer to the second location. In some embodiments, process 600 may include providing yet another version of the portrait that includes the image of the first user and the image of the second user. For example, another version of the portrait may be provided for yet other users to view. In some embodiments, process 600 may further include capturing an image of a third user and adding the image of the third user to the portrait at a third location.

Figure 7:
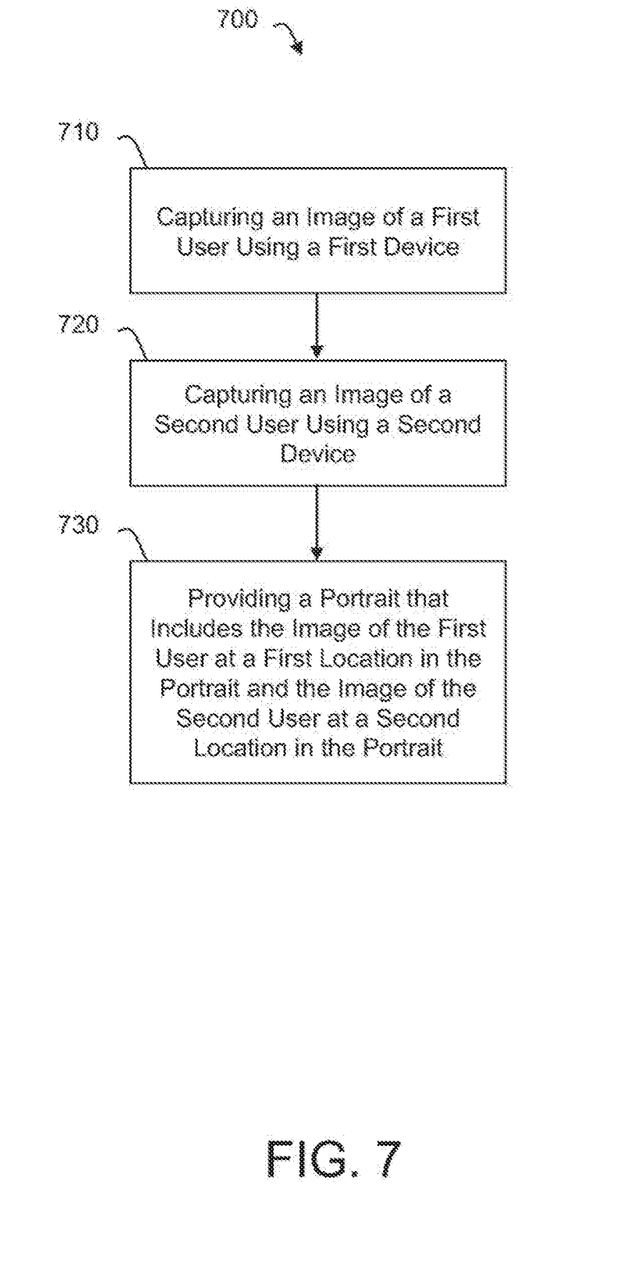

FIG. 7 includes process 700 for creating a group portrait in accordance with one embodiment of the invention. Process 700 can be performed by a communications system (e.g., system 100). At block 710, an image of a first user can be captured using a first device. For example, a user device (e.g., one of user devices 121-124 in system 100) can use an embedded video camera to capture an image of a first user. In some embodiments, an image of a first user can be captured in response to an input from the first user. For example, the first device may receive an input from a user that specifies a location for the user's image in a group portrait (e.g., using screen 300) and an image of the user may be captured in response to that input. At block 720, an image of a second user may be captured using a second device. With the exception of involving a second user and a second user device, block 720 is substantially similar to block 710 and the previous description of the latter can be applied to the former. In some embodiments, the image of the first user can be captured from a stream that is part of a video chat and the image of the second user can be captured from another stream that is part of the same video chat. For example, while the first user and the second user are participating in a video chat, the image of the first user may be captured from the first user's webcam stream and the image of the second user may be captured from the second user's webcam stream.

At block 730, a portrait is provided that includes the image of the first user and the image of the second user. The image of the first user may be provided at a first location in the portrait, and the image of the second user may be provided at a second location in the portrait. For example, each user may specify a location for his or her image and the portrait may be provided with the image at the specified location.

In some embodiments, process 700 may further include capturing an image of a third user using a third device and then adding the image of the third user to a third location in the portrait. In some embodiments, the image of the third user can be captured from a stream that is part of a video chat between all three users.

In some embodiments, the locations in a portrait can be moved based on user input. For example, one or more users may manually reposition the first and second locations or specify a new portrait arrangement (e.g., using screen 400) that requires moving the first and second locations. In some embodiments, process 700 may further include moving the first location and the second location based on user input. For example, a user may change the portrait arrangement (e.g., using screen 400) and the first and second locations may change accordingly. In another example, a user may manually modify the position of the first and second locations.

The previous discussion relates to systems and methods for creating group portraits based on individual images. However, it is understood that this disclosure can also be applied to systems and methods for creating group video portraits based on individual video clips. For example, a user device may capture a video clip of a user (e.g., dancing or waving) and then incorporate that video clip into a group video portrait. After a device captures a user's video clip, the user may be able to add the clip to a specific location in the group video portrait (see, e.g., window 310 shown in FIG. 3).

Figure 8:
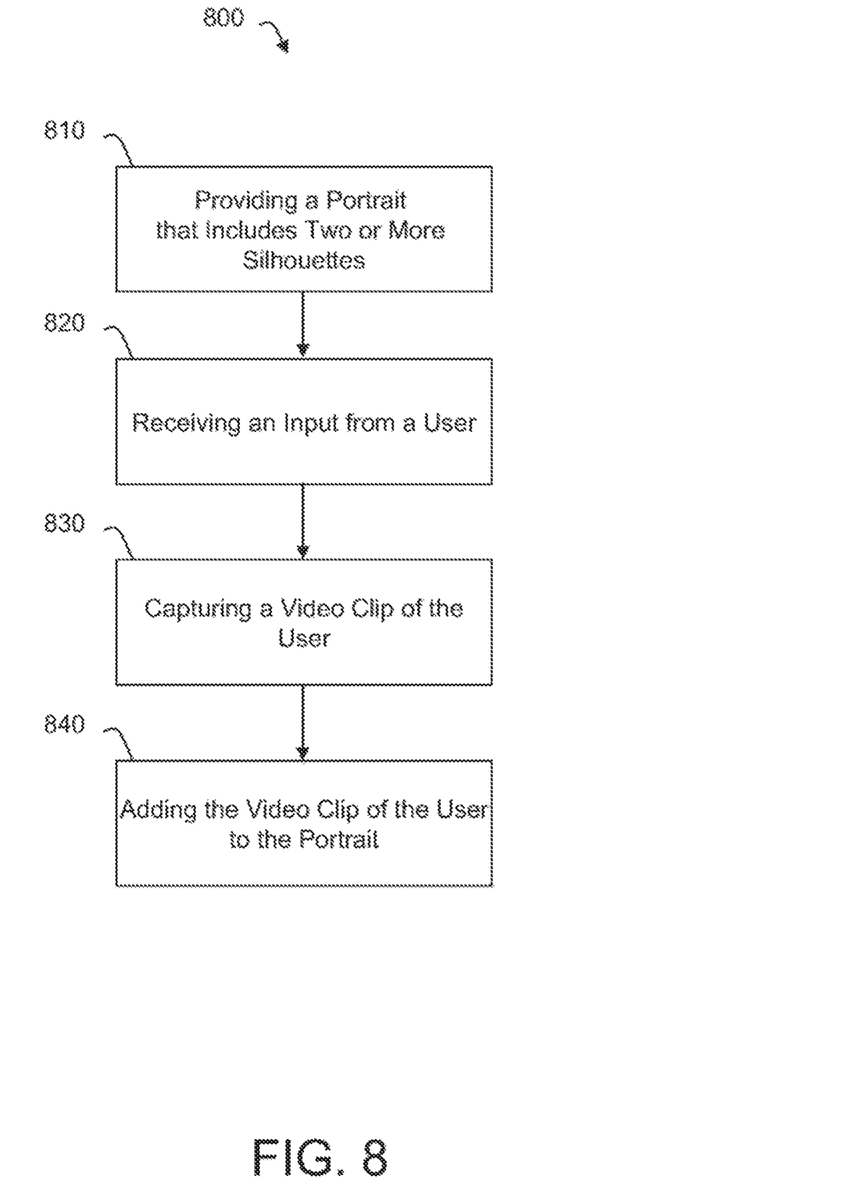
FIG. 8 is a flowchart of an illustrative process for generating a group video portrait in accordance with an embodiment of the invention.

FIG. 8 includes process 800 for creating a group video portrait in accordance with one embodiment of the invention. Process 800 can be performed by a communications system (e.g., system 100). At block 810, a portrait can be provided that includes two or more silhouettes. Block 810 is substantially similar to block 510 of process 500 and the previous description of the latter can be applied to the former. At block 820, an input can be received from a user. For example, the communications system may receive an input from a user through an input device in a user device (e.g., user devices 121-124 in system 100). The input received at block 820 may specify a location for the user's video clip in the group portrait (e.g., using screen 300). In some embodiments, a video feed of a user may be displayed at the location specified by the user (e.g., video feed 312 shown in FIG. 3). In some embodiments, the input received at block 820 may specify that the user is ready for a video clip to be captured. At block 830, a video clip of the user is captured. For example, the communications system may capture a video clip of the user with a video camera embedded in a user device (e.g., user devices 121-124 in system 100). At block 840, the video clip of the user may be added to the group video portrait. For example, the communications system may add the video clip to the portrait at a location specified by the user (e.g., as part of the input received at block 520). The communications system may then remove the corresponding silhouette from the portrait when the user image is added. In some embodiments, the portrait may be updated to show the added video clip and then process 800 may proceed by capturing other user images and adding them to the portrait (see, e.g., process 600 relating to still group portraits).

In some embodiments, process 800 may further include finalizing the group video portrait. For example, the group video portrait can be finalized automatically (e.g., once all eligible users have added video clips) or based on user input (e.g., by pushing button 330). When finalizing a group video portrait, any remaining, unused silhouettes may be removed from the portrait. In some embodiments, video clips in the group video portrait may be rearranged when finalizing the portrait. For example, a group video portrait may include a spatial discontinuity (e.g., a spatial gap) between video clips where silhouettes were not replaced with video clips of users and, when finalizing the portrait, the video clips may be arranged to remove one or more discontinuities.

In some embodiments, process 800 may further include providing a finalized version of the group video portrait where each video clip is played in a loop. For example, the video clips may be played in a loop so that the group video portrait shows constant movement. However, such looping may appear very repetitive to some. Accordingly, to make the group video portrait appear less repetitive, at least two of the users' video clips may be different lengths so that all of the video clips do not simultaneously restart during the looping. In this manner, the completed group video portrait may collectively appear less repetitive even if the individual video clips are repetitive.

The previous description of creating group video portraits based on individual video clips is merely illustrative and it is understood that any other method for adding an image to a group portrait can also be applied to adding a video clip to a group video portrait (see, e.g., screen 200 shown in FIG. 2, screen 300 shown in FIG. 3 and screen 400 shown in FIG. 4). After each user has added his or her video clip to the group portrait, the completed group video portrait may include video clips of every user.

The various embodiments of the invention may be implemented by software, but can also be implemented in hardware or a combination of hardware and software. The invention can also be embodied as computer readable code on a computer readable medium. The computer readable medium can be any data storage device that can store data which can thereafter be read by a computer system. Examples of a computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The above described embodiments of the invention are presented for purposes of illustration and not of limitation. It is understood that one or more features of an embodiment can be combined with one or more features of another embodiment to provide systems and/or methods without deviating from the spirit and scope of the invention.

What is claimed is:

1. A method for composing a group portrait, the method comprising:

providing an initial portrait, the initial portrait being a still image and comprising a background image, wherein the initial portrait further comprises:
a first silhouette representing a first location within the initial portrait and a second silhouette representing a second location within the initial portrait, wherein:
the first location is at a first plane and the second location is at a second plane such that the first silhouette overlaps the second silhouette, and wherein the first location and the second location are predetermined locations for inserting users into the initial portrait; and presenting with a first electronic device a first video chat of at least a portion of a first user, wherein the first live video chat is a live, streaming video, wherein presenting further comprises:
  positioning the first video chat of the at least a portion of the first user over at least one of the first location and the second location;
  capturing, with the first electronic device, a first image from the presented first video chat; and
  adding the captured first image to the provided initial portrait; and
  creating a first new version of the provided initial portrait including the added captured first image.

2. The method of claim 1, wherein the captured first image is added at the first location over the first silhouette.

3. The method of claim 1, wherein prior to capturing, presenting further comprises:
  adjusting the presented first video chat in response to positioning the first video chat.

4. The method of claim 3, wherein adjusting further comprises:
  adjusting at least one of a brightness and a contrast of the presented first video chat.

5. The method of claim 4, wherein the at least one of the brightness and the contrast are adjusted to match the provided initial portrait.

6. The method of claim 3, wherein adjusting further comprises:
  adjusting a size of the portion of first user within the presented first video chat.

7. The method of claim 6, wherein the size of the portion of the first user is adjusted to match a size of the first silhouette.

8. The method of claim 6, wherein the size of the portion of the first user is adjusted to match a size of the second silhouette.

9. The method of claim 3, wherein adjusting further comprises:
  changing a color of the first silhouette in response to positioning.

10. The method of claim 1, further comprising:
  capturing a second image of at least a portion of a second user with a second electronic device; and
  applying the captured second image to the created first new version of the provided initial portrait.

11. The method of claim 10, wherein:
  the first user and the second user are participants in the first video chat; and
  the first video chat is conducted between the first electronic device and the second electronic device.

12. The method of claim 10, wherein applying further comprises:
  applying the captured second image at the second location.

13. The method of claim 12, further comprising:
  generating a second new version of the provided initial portrait in response to applying the captured second image to the created first new version of the provided initial portrait.

* * * * *